United States Patent [19]

Martin

[11] 4,158,549

[45] Jun. 19, 1979

[54] MARIJUANA SCENTED INCENSE AND METHOD OF MAKING

[76] Inventor: Kenneth E. Martin, 30 Hollywood Dr., Florence, Ky. 41042

[21] Appl. No.: 892,098

[22] Filed: Mar. 31, 1978

[51] Int. Cl.² ............................................. C10L 5/44
[52] U.S. Cl. .................................... 44/1 R; 44/10 A
[58] Field of Search .............. 44/1 R, 1 D, 1 E, 10 A, 44/6, 10 B, 10 R, 15 C, 40, 38

[56] References Cited

U.S. PATENT DOCUMENTS

| | | | |
|---|---|---|---|
| 468,427 | 2/1892 | Murdock | 44/10 B |
| 1,216,710 | 2/1917 | Lucas | 44/1 R |
| 1,909,381 | 5/1933 | Tennant | 44/1 R |
| 2,930,719 | 3/1960 | Finberg | 131/17 |
| 2,943,958 | 7/1960 | Schaflander | 131/2 |
| 2,943,959 | 7/1960 | Schaflander | 131/2 |
| 3,063,839 | 11/1962 | Simonet et al. | 99/2 |
| 3,454,377 | 7/1969 | Renwick | 44/40 |
| 3,709,700 | 1/1973 | Ross | 44/6 |

FOREIGN PATENT DOCUMENTS 2270315  12/1975  France ........................ 44/1 D

*Primary Examiner*—Carl Dees
*Attorney, Agent, or Firm*—Wood, Herron & Evans

[57] ABSTRACT

An incense produces, when burned, a marijuana-like scent although it does not contain a marijuana component. The incense comprises about 10 parts by weight ground alfalfa stems and leaves; about 1 part by weight ground bayleaves; and about 1.5 parts by weight powdered non-aromatic waxy maize corn starch binder. These components are mixed, about 6 parts by weight of water is added, and the total mix is then extruded, molded, coated onto bamboo sticks, cut, or otherwise formed. The formed mix is dried of substantially all moisture, and can thereafter be burned to produce a marijuana-like scent.

10 Claims, No Drawings

MARIJUANA SCENTED INCENSE AND METHOD OF MAKING

This invention relates to incense and more particularly to incense having a distinctive burning scent similar to that of marijuana.

At the present time and in many if not all states, the possession of marijuana is illegal, yet many are believed to enjoy its distinctive scent and desire to be able to reproduce that scent without violating any current law. Of course, the scent is available simply by burning the real marijuana, however, as stated, this cannot be accomplished without the risk of arrest, and its consequences.

While several claimed marijuana scent producers have appeared on the market, none of those known accurately reproduce the particular aromatic characteristics of burning marijuana. Accordingly, it has been one objective of the present invention to provide an incense which, when burned, produces a scent or odor like that of burning marijuana.

It has been a further objective of the invention to provide a material which smells like marijuana when burning, yet does not contain, as a component, marijuana, nor other known illegal components.

A further objective of the invention has been to provide methods for providing a marijuana scent without using marijuana.

To these ends, a preferred embodiment of the invention includes a composition of matter which, when burned, gives off a scent or odor like that of burning marijuana, even though the composition does not include marijuana. Specifically, a preferred embodiment of the invention includes a mixture of powdered or ground alfalfa, bayleaves, and a starch binder.

The powdered alfalfa constitutes components from the complete alfalfa plant (stems and leaves), excluding roots, and the starch binder is selected from the group of starch binders which do not produce a distinctive aromatic component when burned.

In a process of making the preferred composition, 10 parts by weight of ground alfalfa, 1 part by weight of ground bayleaves and 1.5 parts by weight of powdered starch binder are thoroughly mixed together. Water in the amount of 6 parts by weight is then added to the mix.

The wet composition is mixed and is thereafter extruded, molded, coated onto a bamboo stick, cut or otherwise formed into a desired shape, and is dried. Substantially all the water is removed by drying so that the moisture content of the finished product is so negligible that it does not impede burning. Thereafter, the incense composition so formed is burned, whereby it gives off a scent or odor which is like that of burning marijuana, even though the mixture does not contain marijuana.

These and other objects and advantages will become readily apparent from the following detailed description of a preferred embodiment of the invention.

More particularly, a preferred embodiment of the invention comprises a composition of about 10 parts by weight ground alfalfa; about 1 part by weight powdered bayleaves; and about 1.5 parts by weight starch binder. While these composition weights may be slightly adjusted without changing the marijuana-like scent upon burning the mixture, changes in the composition weights, to such extent as would vary the desired marijuana scent, are not within the scope of this invention.

The alfalfa to be used is preferably ground or powdered to about a −100 mesh size from wholly cured dehydrated alfalfa stems and leaves. Other grind sizes could be used, however, I have found this size useful. A truer marijuana scent is produced when the entire alfalfa plant, including leaves and stems (but excluding roots) are ground together. The percentage of leaves to stems in ground form is that same leaf to stem percentage by weight normally found in average size mature alfalfa plants.

The bayleaf component comprises the ordinary bayleaf spice, commercially availabe, and also preferably ground to powdered form at −100 mesh size from dehydrated leaves. Other grind sizes could be used, but I have found this size to be useful.

Finally, the starch binder component is selected from a group of starch binders which does not include a distinctive aromatic component when burned. One particular binder which I have found to be useful is the waxy maize starch binder sold by the American Maize Products Company of Hammond, Indiana, as its product known as "Amaizo 721-A." This binder is a cold water soluble, modified, precooked or pre-gelatinized amylopectin corn starch, otherwise referred to in the trade as a pre-cooked or pre-gelatinized waxy maize corn starch. The binder has a higher amylopectin content than does regular corn starch.

Even more particularly, it is known that such starches generally cook to form clear, stable, non-gelling, cohesive pastes which may be in a simi-fluid gel, as contrasted to regular corn starch pastes which are cloudy and have a tendency to gel when cooled after cooking. The preferred starch, known as "Amaizo 721-A" is a powdered form as used in this invention, and has a typical approximate analysis of 5% moisture, a ph (1:3) of 6.5, and 65% of the starch will pass a 200 mesh screen. The starch is modified chemically for acid stability and high viscosity, as is well known. This binder has a ready affinity for water and produces significant binding or adhesive properties for binding the alfalfa and bayleaves components when mixed and wetted. The binder is also ground into a powdered form in a size somewhat similar to that of the ground alfalfa and bayleaves as particularly noted.

In the manufacture of a marijuana scent incense as described, these three components in their approximate basis weights are thoroughly mixed together. To the mixed composition is added about 6 parts by weight of water which is stirred into the mixture. Normally, this amount of water will bring the mixture to a moist granular consistency.

Once in this form, the mixture is then formed into its final shape for burning, and is dried. The final preselected shape can be formed by any suitable process, such as by well-known extrusion or molding processes. Alternatively, bamboo splits or sticks are coated with the mixture and then dried. The mixture can be otherwise formed and cut to provide a shaped incense product.

In one preferred form, the mixture is extruded into cylindrical form up to about one-fourth to one-half inch in diameter, and individual sticks having a length of a portion of an inch or of several inches long are cut from the extrusion to form pre-selected incense stick shapes. Thereafter, the incense is dried in an oven to remove substantially all of the moisture therefrom. Particularly, the moisture is dried from the product to such an extent that subsequent burning is not effected.

The product is then packaged for distribution. When it is desired to burn the incense, the incense is lit by the application of a flame thereto. Upon burning, the product produces a scent or odor that is difficult, if not impossible, to distinguish from the odor of burning marijuana, even though it does not contain a marijuana component nor any other known illegal component.

Moreover, while the incense is not designed for human consumption, it should be noted that the components are basically foods which could normally be consumed by humans without undesirable effects. Thus, even if the incense was accidentally consumed, it is believed to be edible and not harmful to normal human beings.

Accordingly, a process of producing a marijuana scent or odor includes the steps of making the incense composition described above, and thereafter burning it to produce the marijuana-like scent.

Various advantages and modifications of the invention will, upon reading the above, become readily appreciated by those of ordinary skill in the art without departing from the scope of the present invention and applicant intends to be bound only by the claims appended hereto.

I claim:

1. An incense composition comprising:
    about 10 parts by weight ground alfalfa stems and leaves,
    about 1 part by weight ground bayleaves; and
    about 1.5 parts by weight starch binder.

2. A composition of matter as in claim 1 wherein said binder is non-aromatic upon burning.

3. A composition of matter as in claim 2 wherein said binder is a pre-gelatinized waxy maize corn starch binder.

4. A composition of matter as in claim 2 wherein said alfalfa and bayleaves are ground to about −100 mesh size.

5. A composition of matter as in claim 3 wherein said composition is formed by the process of:
    mixing said components;
    adding about 6 parts by weight of water to said components to form a mixture;
    forming the mixture into preselected shapes; and
    thereafter drying the mixture to form said composition.

6. An incense composition comprising:
    about 10 parts by weight ground alfalfa stems and leaves,
    about 1 part by weight ground bayleaves; and
    about 1.5 parts by weight starch binder;
    said incense composition when burned, producing a scent like that of burning marijuana.

7. An incense composition as in claim 6 wherein said binder is non-aromatic upon burning.

8. An incense composition as in claim 7 wherein said binder is a pre-gelatinized waxy maize corn starch binder.

9. A composition of matter as in claim 6 wherein said alfalfa and bayleaves are gound to about −100 mesh size.

10. A composition of matter as in claim 8 wherein said composition is formed by the process of:
    mixing said components;
    adding about 6 parts by weight of water to said components to form a mixture;
    forming the mixture into preselected shapes; and
    thereafter drying the mixture to form said composition.